Nov. 25, 1958     W. C. HASSELHORN     2,862,098
ARC WELDING
Filed Jan. 31, 1955
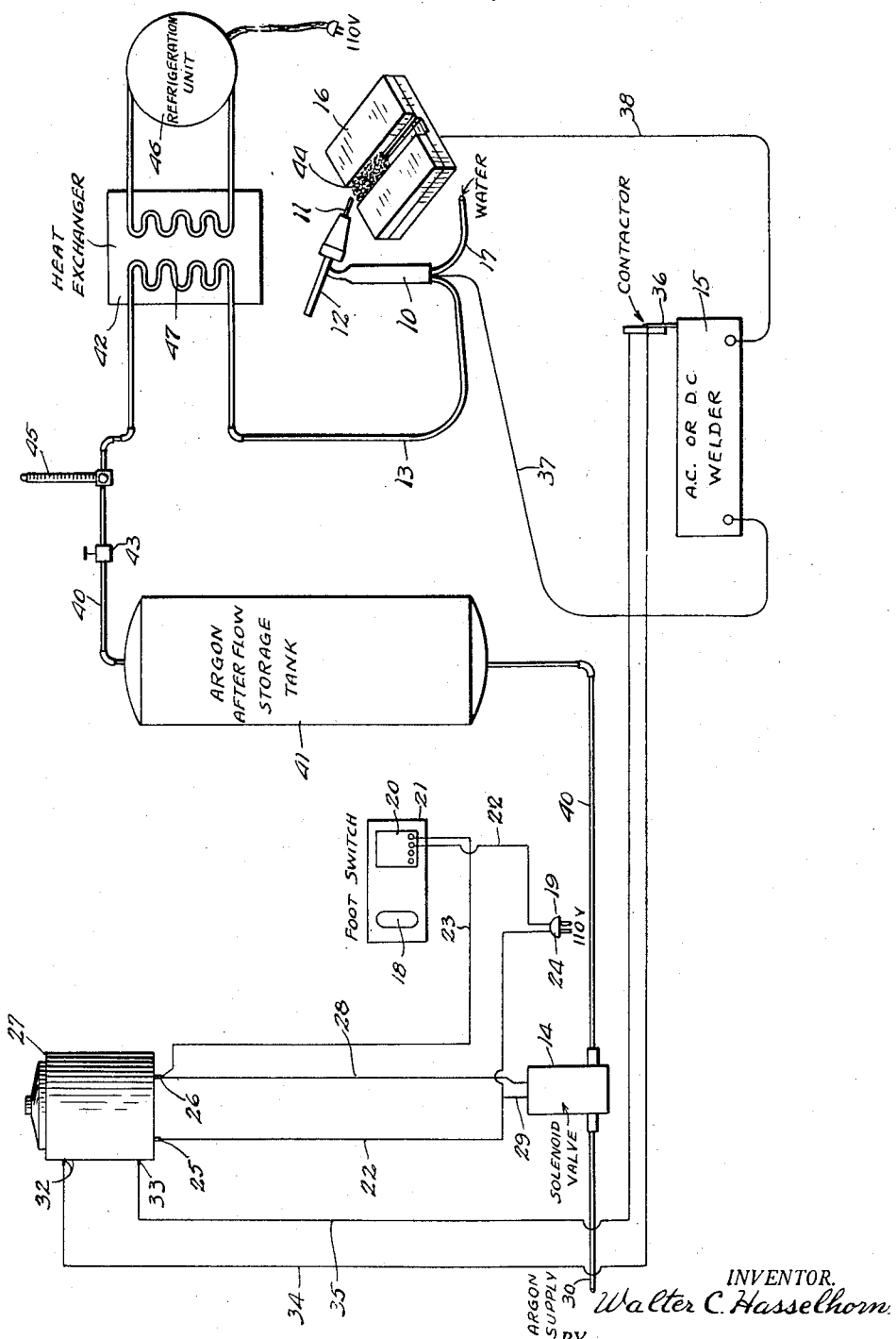
INVENTOR.
Walter C. Hasselhorn

United States Patent Office 2,862,098
Patented Nov. 25, 1958

2,862,098

ARC WELDING

Walter C. Hasselhorn, Evanston, Ill., assignor, by mesne assignments, to Cook Electric Company, Chicago, Ill., a corporation of Delaware Application January 31, 1955, Serial No. 485,107

6 Claims. (Cl. 219—74)

This invention relates to welding.

The invention is directed more particularly to a new and improved method of welding metals and alloys that are extremely difficult to handle, such as titanium, zirconium, tantalum, etc. The invention is not necessarily limited, however, to these particular metals and alloys.

Metals of the foregoing type tend readily to absorb the atmosphere at high welding temperatures. This will produce an unsatisfactory weld. Efforts have been made to supply an inert gas to the electrode and the work during the welding operation. At high welding temperatures, however, the inert gas will not provide an adequate blanket for these parts that will entirely prevent absorption of oxygen or nitrogen of the atmosphere. This is also true after the weld has been made and has not been cooled below oxidation temperature.

It is, therefore, an object of the present invention to provide a new and novel method of welding which includes cooling a protective gas to a low temperature to increase its density and using the cooled gas to cool the welded material as rapidly as possible and form a high concentration of inert gas at the weld and in its vicinity at the time of the welding operation. A protective blanket that is impenetrable by the atmosphere is therefore formed about the weld and electrode.

It is a further object of the invention to provide an automatic control that will supply the cooled dense gas in advance of the arc and will continue the supply thereof even after the arc is extinguished. This latter feature may be accomplished by the use of an after-flow storage tank in the gas supply line.

I preferably cool the gas by passing it through a heat exchanger having a refrigerator system capable of lowering the temperature of the gas to =65° F. or so. It is apparent, therefore, that this precooled low temperature gas will not only advantageously cool the electrode and the weld being made, but will increase the density of the gas so that an impenetrable protective barrier is furnished and even such metals as titanium, zirconium, tantalum, etc., that are readily receptive to oxidation at high welding temperatures will be properly protected.

Other objects and advantages of the invention will be apparent from the following detail description when taken in connection with the accompanying drawing which forms a part thereof.

As shown in the drawing, the torch 10 comprises an electrode 11 carried by a nozzle 12 to which inert gas such as argon, helium, etc., or mixtures thereof is supplied by a conduit 13 controlled by a valve 14. Welding generator 15 energizes a welding circuit which passes through the electrode 11 and the work 16 when an arc is struck. Torch 10 may be liquid cooled by a conduit 17 attached to the jacket of the torch and leading from a suitable source.

To effect operation of the torch 10, a manual control of a suitable type like a foot pedal 18 may be actuated to close circuit 19 through a switch 20 on panel 21. Circuit 19 includes wires 22 and 23 and a source of current supply 24. Wires 22 and 23 connect to terminals 25 and 26 of a time delay relay 27. Valve 14 may be operated by a solenoid connected in the circuit by wires 28 and 29. This valve 14 will be immediately opened when foot pedal 18 is actuated to permit a flow of inert gas from source 30, which inert gas may be argon or helium or a mixture of both, which could include about 5% helium. A second pair of terminals 32 and 33 of time delay relay 27 have wires 34 and 35 connected thereto, the latter leading to contactor 36 of welding generator 15. The welding circuit is completed by a wire 37 connected between welding generator 15 and torch 10 and by a wire 38 connected between generator 15 and the work 16.

Time delay relay 27 delays the closing of the circuit of welding generator 15 a predetermined period after solenoid valve 14 is opened.

When valve 14 is opened, the inert gas will flow through pipe 40 connected to an after-flow storage tank 41 and continue at the other end of the tank to feed to a heat exchanger 42. An adjustable flow control valve 43 is inserted in pipe 40 to restrict the rate of flow from after-flow storage tank 41 so that inert gas may continue to be supplied to torch 10 and to scour the completed weld illustrated at 44 after the circuit of the welding generator 15 is opened and the arc is extinguished. Flow meter 45 may also be provided in pipe 40 if so desired.

A suitable refrigeration unit 46 may be connected to heat exchanger 42 in any satisfactory manner so that the brine of the heat exchanger may cool the inert gas flowing through coil 47 to a suitable low temperature depending on the welding work to be done and the metals to be used. It is found that in some instances a very desirable weld will be made if the temperature of the inert gas is dropped to =10° F., while in other instances suitable welds will be made if the temperature of the inert gas is lowered in the neighborhood of —65° F.

Inasmuch as it is undesirable to establish the welding arc until solenoid valve 14 has been opened and the inert gas has flowed long enough to scour the work and the electrode and form an impenetrable blanket before the electrode can get to a welding temperature, time delay relay 27 will not immediately operate to close the circuit of welding generator 15. The arrangement permits after-flow storage tank 41 to fill and then feed the inert gas through control valve 43 and coil 47 of heat exchanger 42. The low temperature of the inert gas after it leaves heat exchanger 42 makes it possible to provide a substantially higher concentration of gas at the weld and in the vicinity of the weld at the time of welding. The increased density of the gas forms a protective blanket of this higher gas concentration that will be non-absorptive of oxygen or nitrogen of the atmospheric air. Precooling the condensed gas by passing the same through heat exchanger 42 drops the temperature to a range that will effectively cool the weld in minimum time after the arc is extinguished to make sure that the weld will not be at oxidation temperature when the atmospheric air finally reaches it. After-flow storage tank 41 will continue to supply the inert gas through control valve 43, which may be adjustable to regulate the flow, after solenoid valve 14 has been closed and the circuit of the welding generator 15 has been opened. This after-flow reserve in storage tank 41 is sufficient to drop the temperature of the weld below oxidation temperature by reason of the low temperature to which this inert gas is dropped upon passing through coil 47 of heat exchanger 42.

A very satisfactory weld of such metals as titanium, zirconium, tantalum, etc., may be obtained by the use of the welding method disclosed herein although it is understood that the application of the method to other metals and alloys is also contemplated. It has been found that the tensile strength of the weld is considerably increased and in some instances exceeds that of the parent metal. By eliminating any possibility of oxidation, a pitting formation or small holes at the weld will not occur.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In an arc welding apparatus for welding metals like titanium, zirconium, tantalum, etc., comprising a source of inert gas supply, a torch including a nozzle, an electrode, and a connection for said inert gas between said source of supply and said torch, a valve in said connection, a control for said valve, a heat exchanger in said connection between said valve and said torch, and means forming a part of said heat exchanger to lower the temperature of said inert gas and substantially to increase its density by such cooling before reaching said torch whereby to provide a protective barrier about the electrode and the weld to prevent contact with the atmospheric air and to drop the temperature of the weld below oxidation temperature as the torch leaves the weld.

2. In an arc welding apparatus for welding metals like titanium, zirconium, tantalum, etc., comprising a source of inert gas supply, a water-cooled torch including an electrode and a connection for said inert gas between said source of supply and said torch, a valve in said connection, a control for said valve, a heat exchanger in said connection between said valve and said torch, and means forming a part of said heat exchanger to lower the temperature of said inert gas before reaching said water-cooled torch whereby to increase the normal density of said inert gas.

3. In an arc welding apparatus for welding metals like titanium, zirconium, tantalum, etc., comprising a source of inert gas supply, a torch including an electrode and a connection for said inert gas between said source of supply and said torch, a heat exchanger in said connection between said source and said torch, and means associated with said heat exchanger to chill said inert gas and increase its density before reaching said torch whereby to provide a protective barrier about the electrode and the weld to prevent contact with the atmospheric air and to drop the temperature of the weld below oxidation temperature.

4. In an arc welding apparatus for welding metals like titanium, zirconium, tantalum, etc., comprising a source of inert gas supply, a torch including an electrode and a connection for said inert gas between said source of supply and said torch, a heat exchanger in said connection between said source and said torch, means forming a part of said heat exchanger to lower the temperature of said inert gas by prechilling before reaching said torch and thereby to increase the density of said gas so as to provide a protective barrier about said electrode and the weld to prevent contact with atmospheric air, a valve in said connection, a welding circuit for said torch a control circuit for said valve, and means in said connection for continuing the flow of said inert gas to said torch after said control circuit and said welding circuit are de-energized.

5. The method of electric arc welding metals like titanium, zirconium, tantalum, etc., which comprises prechilling and increasing the normal density of an inert gas by passing the inert gas through a heat exchanger before reaching the torch, and feeding the prechilled dense inert gas to the torch as a protective barrier about the torch-electrode and the work to prevent contact with the atmospheric air and to drop the temperature of the work below oxidation temperature.

6. The method of electric arc welding which comprises prechilling and increasing the normal density of an inert gas by passing the inert gas through a brine-cooled heat exchanger before reaching the torch, and feeding the prechilled dense inert gas to the torch to lower the temperature of the torch-electrode and the work, below the temperature of oxidation, the temperature of the work being held below the temperature of oxidation when brought into contact with atmospheric air as the torch leaves the weld.

References Cited in the file of this patent

UNITED STATES PATENTS

| | | |
|---|---|---|
| 2,497,631 | Rothschild | Feb. 14, 1950 |
| 2,510,207 | Behnke et al. | June 6, 1950 |
| 2,576,793 | Jordan | Nov. 27, 1951 |
| 2,630,513 | Redmond | Mar. 3, 1953 |
| 2,747,065 | Diehl | May 22, 1956 |
| 2,777,928 | Bernard | Jan. 15, 1957 |